US005856395A

United States Patent [19]

Tanisho et al.

[11] Patent Number: 5,856,395

[45] Date of Patent: Jan. 5, 1999

[54] RESIN COMPOSITION AND ARTICLES MADE THEREFROM

[75] Inventors: Hajime Tanisho, Yokohama; Yuji Koshima, Tokyo; Teiji Kohara, Kawasaki, all of Japan

[73] Assignee: Nippon Zeon Co., Ltd., Tokyo, Japan

[21] Appl. No.: 752,890

[22] Filed: Nov. 20, 1996

[30] Foreign Application Priority Data

Nov. 22, 1995 [JP] Japan .................................. 7-328159

[51] Int. Cl.[6] ...................................................... C08K 3/00

[52] U.S. Cl. .......................... 524/413; 524/403; 524/406; 524/408; 524/413; 524/430; 524/433; 524/435; 524/438

[58] Field of Search .................................... 524/403, 406, 524/408, 413, 433, 430, 435, 436; 523/137

[56] References Cited

U.S. PATENT DOCUMENTS

| | | | |
|---|---|---|---|
| 4,687,803 | 8/1987 | Teramoto et al. | 524/413 |
| 4,783,279 | 11/1988 | Petermann et al. | 252/511 |
| 4,874,727 | 10/1989 | Ohya et al. | 501/134 |
| 4,879,085 | 11/1989 | Sterzel | 252/600 |
| 4,929,571 | 5/1990 | Iltis et al. | 501/137 |
| 5,187,012 | 2/1993 | Takahashi et al. | 428/402 |

FOREIGN PATENT DOCUMENTS

| | | |
|---|---|---|
| 0 496 112 | 7/1992 | European Pat. Off. . |
| 2 090 713 | 1/1992 | France . |
| 2-302450 | 12/1990 | Japan . |
| 1 470 502 | 4/1977 | United Kingdom . |
| 2 204 588 | 11/1988 | United Kingdom . |
| WO 92 18213 | 10/1992 | WIPO . |

*Primary Examiner*—Edward J. Cain

*Attorney, Agent, or Firm*—Armstrong, Westerman, Hattori, McLeland & Naughton

[57] ABSTRACT

The present invention relates to a resin composition having a high dielectric constant and a low dielectric loss tangent under high frequency conditions and articles obtained therefrom. The resin composition comprises 100 parts by weight of thermoplastic resin and 50–900 parts by weight of ferroelectric material. The formed articles can be used as substrates for a miniaturized antenna or circuit.

18 Claims, No Drawings

RESIN COMPOSITION AND ARTICLES MADE THEREFROM

TECHNICAL FIELD

The present invention relates to a resin composition having excellent performance under high frequency conditions and articles made therefrom. More particularly, the present invention relates to a resin composition having a high dielectric constant and a low dielectric loss tangent under high frequency conditions, and articles obtained therefrom.

BACKGROUND ART

High density radio communications such as satellite broadcast systems, satellite communication systems, high-vision television broadcast systems, and cellular phone systems have come into wide use. And the frequency band in use is shifting to higher frequencies. To facilitate transportation of portable communication systems such as global positioning systems (navigation systems) and to make them smaller, miniaturization of the antenna for radio communication and the circuit substrate are desired.

An antenna for high frequency communication has a basic structure in which a metal foil such as copper foil is laminated on an antenna substrate. The antenna substrate is requested to be made from a material having a high dielectric constant and a low dielectric loss tangent. If the antenna substrate has these properties, even small antennae can receive and send high frequency radio waves. If the material has a high dielectric loss tangent, the transfer loss of information tends to be large and the sensitivity of receipt and transmission tends to have a low sensitivity and to be noisy. If the material has a low dielectric constant, the substrate or the antenna therefrom is difficult to be made small or to be miniaturized.

Formerly, some antenna substrates which have a high dielectric constant and a low dielectric loss tangent have been developed and are made of glass fibers prepregs, which have a comparatively high dielectric constant, preimpregnated with thermoset resins in which a powder of ceramics, which has a high dielectric constant, such as titania is added. However the process using such prepreg to make an antenna substrate is complicated and takes a great deal of time (i.e. >24 hrs.).

On the other hand it is known that there are resins, such as polyphenyleneoxide and polyphenylene sulfide, which have a low dielectric loss tangent.

However, their dielectric constant is too low, and their electrical properties are affected by the environmental temperature. They cannot be used as a substrate for a small antenna or a small circuit.

DISCLOSURE OF THE INVENTION

As a result of intensive research, the inventors have found that when a ferroelectric material is added to thermoplastic resins, there can be obtained resin compositions excellent in formability and substrates made therefrom which are excellent in having a high dielectric content and a low dielectric loss tangent.

The present invention provides resin compositions comprising 100 parts by weight of a thermoplastic resin and 50–900 parts by weight of ferroelectric materials, and articles made therefrom. cl BEST MODE FOR CARRYING OUT THE INVENTION

(Thermoplastic resin)

The thermoplastic resins used in the present invention are not limited. Examples are addition polymerization resins such as polyethylene, polypropylene, poly-4-methylpentene-1, polystyrene, polyvinylidene chloride, fluororesin, polymethyl methacrylate, addition polymerization polymers made from norbornene type monomers, etc.; condensation polymerization resins such as polyamide, polyester, polycarbonate, polyphenyleneoxide, etc.; polyaddition resins such as thermoplastic polyurethane, etc.; ring-opening polymerization resins such as polyacetal, ring-opening polymer made from norbornene type monomers, etc.; hydrogenated products of these resins which have unsaturated bonding in the structure such as hydrogenated products of ring-opening polymers made from norbornene type monomers, etc.; etc.

If the thermoplastic resin has polarity, it has a high dielectric loss tangent. Resins which have no polarity, or resins which are composed of only carbon atoms and hydrogen atoms, are preferably used in the present invention. Also, a thermoplastic resin which contains unsaturated bonding in main chain structure has a high dielectrics loss tangent. Therefore, resins which have substantially no unsaturated bonding in the main chain structure are preferably used in the present invention. In general, addition polymerization resins made from monoolefins (such as polyethylene, polypropylene and poly-4-methylpentene-1), addition polymerization polymers made from norbornene type monomers, and hydrogenated products of ring-opening polymers made from norbornene type monomers and the like have a low dielectric loss tangent, and they are preferably used in the present invention. The dielectric loss tangent of thermoplastic norbornene type polymer resins such as addition polymerization polymers made from norbornene type monomers, hydrogenated products of ring-opening polymers made from norbornene and the like are more preferably used in the present invention, because these resins remain highly stable with changes in temperature.

The thermoplastic norbornene type resins used in the present invention are resins which are disclosed in Japanese Patent Kokai Nos. 1-168725, 1-190726, 3-14882, 3-122137, 4-64807 and U.S. Pat. No. 5,191,026, and examples thereof are ring-opening polymers of norbornene type monomers and hydrogenation products thereof, addition polymerization polymers of norbornene type monomers and addition copolymerization polymers of norbornene type monomers and olefins and modification products of these polymers. These publications are incorporated by reference.

The norbornene type monomers are monomers which are disclosed in the above-mentioned patent publications and Japanese Kokai Nos. 2-227424 and 2-276842, and as examples thereof, mention may be made of norbornene, its alkyl, alkylidene or aromatic substituted derivatives and these substituted or unsubstituted derivatives substituted with a polar group, e.g., halogen, hydroxyl group, ester group, alkoxy group, cyano group, amide group, imide group, silyl group, etc., such as 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5- methoxycarbonyl-2-norbornene, 5-phenyl-2-norbornene, 5-phenyl-5-methyl-2-norbornene, 5-hexyl-2-norbornene, 5-octyl-2-norbornene, 5-octadecyl-2-norbornene, etc.; additional products of norbornene with cyclopentadiene and their derivatives or substitution products as mentioned above, such as 1,4:5,8-dimethano-2,3-cyclopentadieno-1,2,3,4,4*a* ,5,8,8*a*- octahydronaphthalene, 6-methyl-1,4:5,8-dimethano-1,4,4*a*,5,6,7,8,8*a*-octahydronaphthalene, 1,4:5,10:6,9-trimethano-2,3-cyclopentadieno-1,2,3,4,4*a*,5,5*a*,6,9,9*a*,10,10*a*- dodecahydroanthracene, etc.; monomers having two or more ring structure, which are oligomerization products of cyclopentadiene by Diels-Alder reaction, and their derivatives or substitution products as mentioned above, such as dicyclopentadiene, 2,3-dihydrodicyclopentadiene, etc.; addition products of cyclopentadiene and tetrahydroindene, etc. and their derivatives and substitution products as mentioned above, such as 1,4-methano-1,4,4*a*,4 *b*,5,8,8*a*,9*a*-octahydrofluorene, 5,8-methano-2,3-cyclopentadieno-1,2,3,4,4*a*,5,8,8*a*-octahydronaphthalene, etc. These publications are incorporated by reference.

The molecular weight of the thermoplastic norbornene type resin used in the present invention is suitably 10,000–200,000, preferably 15,000–100,000, more preferably 20,000–50,000 in terms of number-average molecular weight measured as polystyrene by GPC (gel permeation chromatography) analysis using toluene as a solvent. When the molecular weight is too small, mechanical strength of the articles made therefrom may be too small. When the molecular weight is too large, the resin may be difficult to mold.

When the thermoplastic norbornene type resin has unsaturated bonds in its main chain structure, such as in ring-opening polymerization polymers of norbornene type monomers, it is preferable to hydrogenate the resin to saturate them. When the resin is hydrogenated, preferably at least 90%, more preferably at least 95%, especially preferably at least 99% of the unsaturated bonds in the main chain structure are saturated. A resin having many unsaturated bonds in the main chain structure tends to have lower heat deterioration resistance and may not remain stable for a long time. Such resin also tends to have a higher dielectric loss tangent as mentioned above.

Moreover, the proportion of monomers having polar groups to the monomers from which the thermoplastic norbornene type resin is made is preferably 70 mole % or less, more preferably 30 mole % or less, especially preferably 0 mole %. A resin having many polar groups tends to polarize and tends to absorb water or humidity, therefore its dielectric loss tangent tends to be changed largely.

If the resin contains a large amount of metal atoms, it tends to have a high dielectric loss tangent, and uneven density of metal atoms causes uneven dielectric loss tangent within one formed article and between formed articles. It is possible to reduce the amount of metal atoms in the resin, for example, by treating a resin solution with adsorbents having a pore volume of 0.5 $cm^3/g$ or more, preferably 0.7 $cm^3/g$ or more, or treating the resin solution with alumina with a specific surface area of preferably 250 $cm^2/g$ or more, or by repeated washing of the resin solution alternatively with acidic water and pure water.

To reduce the content of metal atoms originating from the polymerization catalyst and hydrogenation catalyst, which tend to remain in the resin, it is preferable to hydrogenate the ring-opening polymer using a hydrogenation catalyst metal, such as nickel, supported on an adsorbent as mentioned above. In this case, the adsorbent may adsorb the metal atoms originating from the polymerization catalyst, and hydrogenation catalyst metal is easily removed by filtration in the presence of the adsorbent. It is possible to reduce the content of each metal atom to 1 ppm or less.

The glass transition temperature (hereinafter referred to as Tg) of the thermoplastic norbornene type resin used in the present invention is preferably at least 110° C., more preferably at least 120° C., especially preferably at least 130° C., and preferably 200° C. or lower. Article made from resin having low Tg tends to have lower heat resistance, and a resin having high Tg may be difficult to mold.

(Ferroelectric material)

A ferroelectric material is a material having a very large dielectric constant. The value of dielectric constant increases with an increase in temperature in a lower temperature region where the temperature is lower than the critical temperature (Curie temperature), and decreases with an increase in temperature in a higher temperature region where the temperature is higher than Curie temperature. At Curie temperature a phase transfer occurs and the value of dielectric constant changes drastically. Spontaneous electric polarization occurs in a lower temperature region.

A substrate for an antenna, a circuit and the like is used usually at environmental temperature of −40° C. or higher, preferably at −30° C. or higher, more preferably at −20° C. or higher, and usually at 100° C. or lower, preferably at 90° C. or lower, more preferably 85° C. or lower. The ferroelectric material used in the present invention preferably has a Curie temperature near and slightly higher than the temperature at which the substrate is used, because the value of dielectric constant becomes largest at a temperature near the Curie temperature. In other words, the ferroelectric material used in the present invention has a Curie temperature of preferably 100° C. or higher, more preferably 110° C. or higher, especially preferably 120° C. or higher, and preferably 300° C. or lower. A ferroelectric material having a lower Curie temperature is less likely to function as ferroelectric msterial. A ferroelectric material having a higher Curie temperature tends to be more difficult to obtain and use. A ferroelectric material having a Curie temperature of 300° C. or higher tends to have a lower dielectric constant in many cases, because the environmental temperature is much lower than the Curie temperature.

The ferroelectric material used in the present invention has a very large dielectric constant value of preferably 120 or larger, more preferably 140 or larger at a frequency of 1 KHz. The larger the value is, the smaller amount of the material in a resin composition may function.

Examples of ferroelectric material are simple compounds having a simple cubic perovskite structure such as $BaTiO_3$, $PbTiO_3$, $PbZrO_3$, $NaNbO_3$, $KNbO_3$, $AgNbO_3$, $WO_3$, etc.; complex compounds having a perovskite structure such as $(K_{1/2}Bi_{1/2})TiO_3$, $Pb(Fe_{1/2}Ta_{1/2})O_3$, $Pb(Co_{1/4}Mn_{1/4}W_{1/2})O_3Pb(Zr_{1/3}Ti_{2/3})O_3$, $Pb(Mg_{1/3}Nb_{2/3})O_3$, etc.; materials having perovskite-related octahedral structure such as $LiNbO_3$, $LiTaO_3$, $PbNb_2O_6$, $PbTa_2O_6$, $Ba_{1/2}Sr_{1/2}Nb_2O_6$, $Ba_2NaNb_5O_{15}$, $PbBi_2Nb_2O_9$, $Bi_2WO_6$, $Bi_4Ti_3O_{12}$, $Cd_2Nb_2O_7$, $Cd_2Ta_2O_7$, $Pb_2Ta_2O_7$, $Pb_2Nb_2O_7$, etc. Compounds having a perovskite structure may cause spontaneous electric polarization easily at the environmental temperature. Preferably a compound having a perovskite structure, more preferably $BaTiO_3$, $BaPbO_3$, $CaTiO_3$, or $SrTiO_3$ is used as the ferroelectric material in the present invention.

The shape of the particles of ferroelectric material used in the present invention is not limited. If the shape is spherical, it is easy to mix the ferroelectric material into the resin to a high density and homogeneously, and such a resin composition is easily formed by melting though the melt viscosity of the resin composition with some filler tends to increase. From that perspective, the shape of the ferroelectric particles is preferably spherical. If the shape is fibrous, it is easy to increase the dielectric constant of the resin composition with relatively small additional amount. From that perspective, the shape of ferroelectric electric particles is preferably fibrous. In the case of spherical ferroelectric particles, the maximum particle diameter is 0.1 μm or more, preferably 0.2 μm or more, more preferably 0.5 μm or more, and 30 μm or less, preferably 20 μm or less, more preferably 10 μm or less from the point of density, homogeneity, and melt viscosity. In the case of fibrous ferroelectric particles, the diameter is 0.1 μm or more, preferably 0.2 μm or more, more preferably 0.5 μm or more, and 60 μm or less, preferably 40 μm or less, more preferably 20 μm or less, and the length is 10 μm or more, preferably 20 μm or more, more preferably 30 μm or more, and 10,000 μm or less, preferably 1,000 μm or less, more preferably 100 μm or less from the point of density, homogeneity, melt viscosity, and dielectric constant.

(Resin Composition)

The resin composition of the present invention comprises 100 parts by weight of a thermoplastic resin and 50 parts or more, preferably 75 parts or more, more preferably 100 parts or more, and 900 parts or less, preferably 500 parts or less, more preferably 250 parts or less by weight of ferroelectric material. If the amount of the ferroelectric material is too large, it is difficult to form a substrate for an antenna or a circuit in some cases, and the ferroelectric particles are not homogeneously dispersed in the resin composition in some cases. If the amount of the ferroelectric material is too small, the dielectric constant of the resin composition is not high enough.

If necessary, the resin composition of the present invention may contain various additives, for example, antioxidants such as those of a phenol type and phosphorus type; heat deterioration inhibitors such as those of a phenol type; ultraviolet absorbers such as those of a benzophenone type; antistatic agents such as those of an amine type; and lubricants such as esters of aliphatic alcohols and partial esters or partial ethers of polyhydric alcohols. Furthermore, if necessary, other resins or rubbery polymers or some filler other than the ferroelectric materials may be added so long as the object of the present invention is not affected.

The methods for preparing the resin composition of the present invention are not limited. A suitable method is the blending of the thermoplastic resin, ferroelectric material, and optional additives by a mixing roll, Brabender plastograph, extruder, etc.

(Forming)

The resin composition of the present invention is formed by conventional methods for forming thermoplastic resins, such as melt forming (injection molding, extrusion molding, blow molding, injection blow molding, hot pressing, calendering, etc.) and solvent casting in case of forming sheets or films.

In case of melt forming, the temperature of the resin composition was determined based on the melt viscosity of the resin composition, the difficulty of filling the resin composition into a mold, etc. The resin composition is usually melted at a temperature near or higher than the temperature suitable for the thermoplastic resin to be formed. For example, in case the thermoplastic resin is a thermoplastic norbornene type resin, the resin composition is usually heated at about 260°14 300° C. in order to be melted and formed. The temperature must be adjusted in some cases depending on the kind, shape, amount, etc. of the ferroelectric material.

In case of solvent casting, the resin composition (including some ferroelectric material) is dissolved in a solvent in which the thermoplastic resin is soluble, for example, an aromatic solvent such as toluene, xylene, etc., and a cyclic aliphatic solvent such as cyclohexane, decaline, etc., when the thermoplastic resin is the hydrogenated product of a ring-opening norbornene type polymer, then the ferroelectric particles are dispersed sufficiently in the solution, and sheets or films are formed by casting. It is also possible to obtain film or sheet by dissolving the resin (including no ferroelectric material) in a solvent in which the resin is soluble, adding the ferroelectric particles and dispersing them sufficiently in the solution, and then forming by casting. The concentration of the solution for casting (the proportion of total amount of the thermoplastic resin, the ferroelectric material and the additives, if necessary, in the total amount of the solution) is 5% by weight or more, preferably 10% by weight or more, more preferably 15% by weight or more, and 50% by weight or less, preferably 40% by weight or less, more preferably 30% by weight or less. If the concentration is too low, sheets or films having a sufficient thickness cannot be obtained. If the concentration is too high, it is difficult to obtain sheets or films having a uniform thickness and a uniform concentration of ferroelectric material within a sheet or a film and between sheets or films.

In some cases, the sheets or films may not be strong enough as a result of containing the ferroelectric material. For some purposes, it is required that the sheets or films be stronger than usual. It is possible to enhance the strength of the sheets or films by crosslinking by adding organic peroxides or other cross-linking agents and cross-linking assistants to the composition or the solution.

For example, when a thermoplastic norbornene type resin is used as the thermoplastic resin in the present invention, and is formed by the casting method, the amount of the organic peroxide is in the range of 0.001 to 30 parts by weight based on 100 parts by weight of the thermoplastic norbornene type resin, and the amount of cross-linking assistant is in the range of 0.1 to 10 parts by weight based on 1 part by weight of the organic peroxide. The organic peroxide and cross linking assistant are added when the resin composition is made or when the casting solution is made. The sheets or films are formed by the casting method at a temperature where the cross-linking reaction does not occur. Then the sheets or films are heated and kept hot. The temperature for cross-linking is determined by the combination of the organic peroxide and cross-linking assistant, and it is usually in the range of 80° C. to 350° C. The sheets or films are kept at the temperature for a sufficient time for cross-linking, which is usually more than about 4 times as long as the half-life of the organic peroxide, generally in the range of 5 to 120 minutes.

As examples of peroxides, there can be mentioned hydro peroxides such as t-butylhydroperoxide, p-methanehydro peroxide, etc.; dialkyl peroxides such as dicumyl peroxide, t-butylcumyl peroxide, α,α'-bis(t-butyl peroxy-m-isopropyl)benzene, etc.; diacyl peroxides; peroxiketals; etc. As example of cross-linking assistants, there can be mentioned allyl cross-linking assistants such as diallyl phthalate, triallyl cyanurate, triallyl isocyanurate, etc.; methacrylate cross-linking assistant such as ethylene glycol dimethacrylate, trimethylolpropane trimethacrylate, etc.; oxime nitroso cross-linking assistants such as benzoquinonedioxime, p-nitroso phenol, etc.; maleimide cross-linking assistant such as N,N-m-phenylene-bis-maleimide, etc.; vinyl cross-linking assistants; etc.

(Formed Article)

The shape and size of the formed articles are not limited and may be determined according to the purpose of use. The formed articles have a dielectric constant of 3.0 or higher, preferably 4.0 or higher, more preferably 5.0 or higher, and preferably 500 or lower, more preferably 100 or lower, especially preferably 30 or lower, and a dielectric loss tangent (higher than 0) of 0.0100 or lower, preferably 0.0020 or lower, more preferably 0.0010 or lower in a high frequency band of 1 GHz or higher. If the dielectric constant is too low, it is difficult to miniaturize the substrates for antenna or circuit, or the high frequency property is not enough. If the dielectric constant is too high, it is difficult to obtain the resin composition. If the dielectric loss tangent is too high, the transfer loss of information tends to be large, the sensitivity of receipt and transmission tends to be lower in the case of an antenna substrate, and such system tends to be noisy.

(Uses)

The formed articles of the present invention can be used as small substrates for a miniaturized antenna or circuit because of their properties such as high dielectric constant, low dielectric loss tangent, etc. under high frequency conditions.

(Effect)

The formed articles made from the resin composition of the present invention have high dielectric constant and low dielectric loss tangent. The resin composition of the present invention can be easily formed by the forming methods for thermoplastic resins such as melt forming methods, solvent casting methods, etc. On the other hand, former materials having a high dielectric constant and a low dielectric loss tangent are difficult to form into articles.

EXAMPLE

The present invention will be explained in detail by the following examples, comparative examples, and reference examples. The dielectric constant and the dielectric loss tangent were measured in accordance with JIS K 6911.

Example 1

Three compositions are obtained by mixing 100 parts by weight of the hydrogenated products of a ring-opening polymer made from norbornene type monomer (ZEONEX 280 manufactured by Nippon Zeon Co., Ltd., Tg: about 140° C.; number-average molecular weight measured as polystyrene by GPC using toluene: about 28,000; hydrogenation rate of main chain structure: at least 99%; amount of metal element: about lppm) and 50 parts, 100 parts, and 200 parts respectively by weight of $BaTiO_3$ (BT-1 OOP manufactured by Fuji Titan Industry K.K., particle average diameter: 1.58 $\mu$m; Ba/Ti molar ratio: 0.981, $\epsilon$=2,000, perovskite structure), kneading by a twin-screw extruder at a resin temperature of 250° C. and then pelletizing.

A pellet of each composition of the present invention was heated and melted at 280° C., and formed into an A4 size sheet (210 mm×297 mm, thickness: 0.1 mm) by extrusion molding using a die blade having a width of 210 mm. The dielectric constant and the dielectric loss tangent of the sheet at 1 GHz, 3 GHz, and 5 GHz were measured at 25° C. The results are shown in Table 1.

Example 2

Three kinds of pellets of the resin compositions were obtained, three kinds of sheets were formed, and the electric properties were measured in the same manner as in Example 1 except that $CaTiO_3$(CT-03manufactured by Sakai Chemical Industry, particle average diameter: 0.3 $\mu$m; Ca/Ti molar ratio: 1.001, $\epsilon$=160, perovskite structure) was used in place of $BaTiO_3$. The results are shown in Table 1.

Example 3

Three kinds of pellets of the resin compositions were obtained, three kinds of sheets were formed, and the electric properties were measured in the same manner as in Example 1 except that $SrTiO_3$ (ST manufactured by Fuji Titan Industry K.K., particle average diameter: 0.95 $\mu$m; Sr/Ti molar ratio: 0.992, $\epsilon$=330, perovskite structure) was used in place of $BaTiO_3$. The results are shown in Table 1.

Comparative Example 1

A pellet of the resin was obtained, a sheet was formed, and the electric properties were measured in the same manner as in Example 1 except that $BaTiO_3$ was not used. The results are shown in Table 1.

Comparative Example 2

Three kinds of pellets of the resin compositions were obtained, three sheets were formed, and the electric properties were measured in the same manner as in Example 1 except $Al_2O_3$ (AS 10 manufactured by Shin'etsu Sekiei, particle average diameter: 0.5 $\mu$m, $\epsilon$=10, no ferroelectric) was used in place of $BaTiO_3$. The results are shown in Table 1.

Reference Example 1

690 parts by weight of dehydrated toluene, 200 parts by weight of 1,4-methano-1,4,4*a*,9*a*-tetrahydro-fluorene, 1.1 parts by weight of 1-hexene, 11 parts by weight of 0.3% by weight solution of tungsten chloride in toluene and 0.6 part by weight of tetrabutyltin were charged into a reactor where the inner atmosphere had been replaced with nitrogen, and polymerization reaction occurred at 60° C. under ordinary pressure for 1 hour. The number-average molecular weight and weight-average molecular weight of the polymer in the reaction mixture were measured as polystyrene by GPC method using toluene as a solvent. The number-average molecular weight (Mn) of the polymer was 17,700, the weight-average molecular weight (Mw) of the polymer was 35,400, the molecular weight distribution (Mw/Mn) of the polymer was 2.00.

6 parts by weight of nickel catalyst supported on alumina (4.2 part by weight of nickel, 1.2 part by weight of nickel chloride and 0.6 part by weight of alumina, alumina has pore volume of 0.8 $cm^3$/g, and specific surface area of 300$cm^2$/g) and 5 parts of isopropyl alcohol were added to 240 parts by weight of the reaction mixture. The reaction mixture was reacted in the autoclave at 230° C. under 45kgf/$cm^2$ for 5 hours.

The catalyst for hydrogenation was filtered and removed. The hydrogenation reaction mixture was added into the agitating mixture containing 250 parts by weight of acetone and 250 parts by weight of isopropyl alcohol. The resin was precipitated and filtered. After washing by 200 parts by weight of acetone, the resin was dried in a vacuum dryer wherein the atmospheric pressure was 1 mmHg or less at 100° C. for 24 hours. The hydrogenation ratio of unsaturated bonds in the main structural chain of the polymer measured by $^1$H-NMR was 99.9%, the hydrogenation ratio of aromatic ring structures was at least about 99.8%. The number-average molecular weight and weight-average molecular weight were measured as polyisoprene by GPC using cyclohexane as a solvent. The number-average molecular weight (Mn) of the hydrogenated polymer was 22,600, the weight-average molecular weight (Mw) of the hydrogenated polymer was 42,500, the molecular weight distribution (Mw/Mn) of the hydrogenated polymer was 1.88. Tg was 136° C. The amount of metal element was about 1 ppm. The resins were kneaded by a twin-screw extruder at a resin temperature of 250° C. and pelletized.

Example 4

Pellets of resin were obtained in the same manner as in Comparative Example 1 except that the resin obtained in Reference Example 1 in place of the hydrogenated products of ring-opening polymer (ZEONEX 280). 20 parts by weight of the pellet, 0.02 part by weight of $\alpha,\alpha'$-bis(t-butylperoxi-m-isopropyl)benzene and 0.0002 part by weight of diallylphthalate were dissolved in 80 parts by weight of toluene. 10 parts, 30 parts and 60 parts by weight of $BaTiO_3$ was added and three different $BaTiO_3$ density solutions were obtained. These solutions were agitated sufficiently for $BaTiO_3$ to be homogeneously dispersed and not to be precipitated, and then casted on a SUS board with the surface like a mirror. The obtained sheet was dried at 60° C. for 20 minutes, then it was dried at 120° C. for 10 minutes. The sheet was peeled from the SUS board and has a thickness of about 150 $\mu$m. The electric properties of the sheet were measured. The results are shown in Table 1.

Comparative Example 3

A pellet was obtained in the same manner as in Example 1 except that the resin obtained in Reference Example 1 was used as the thermoplastic norbornene type resin and $BaTiO_3$ was not added, the sheet was obtained in the same manner as in Example 4, and the electric properties of the sheet were measured. The results are shown in Table 1.

Comparative Example 4

A pellet was obtained, and a sheet was obtained in the same manner as in Comparative Example 2 except that the resin obtained in Reference Example 1 was used as the thermoplastic norbornene type resin. The results are shown in Table 1.

Example 5

The electric properties of a sheet in Example 1, which was made from the resin composition comprising 100 parts by weight of thermoplastic norbornene type resin and 50 parts by weight of $BaTiO_3$, were measured at 25° C., 50° C., and 100° C. at 1 GHz. The results are shown in Table 2.

Example 6

The electric properties of a sheet in Example 2, which was made from the resin composition comprising 100 parts by weight of thermoplastic norbornene type resin and 50 parts by weight of $CaTiO_3$, were measured at 25° C., 50° C., and 100° C. at 1 GHz. The results are shown in Table 2.

Example 7

The electric properties of the sheet in Example 3, which is made from the resin composition comprising 100 parts by weight of thermoplastic norbornene type resin and 50 parts by weight of $SrTiO_3$, was measured at 25° C., 50° C., and 100° C. at 1 GHz. The results are shown in Table 2.

Example 8

A mixture of 100 parts by weight of polypropylene (UP Polypro manufactured by Chisso) and 50 parts by weight of $BaTiO_3$ was kneaded by a twin-screw extruder at a resin temperature of 200° C. and then pelletized. The pellets were heated and melted at 230° C., and formed into an A4 size sheet (thickness: 0.1 mm) by extrusion molding using a die blade having a width of 210 mm. The electric properties of the sheet were measured at 25° C., 50° C. and 100° C. at 1 GHz. The results are shown in Table 2.

TABLE 1

| | Thermoplastic resin | Ferroelectric | Amount of ferroelectric material per 100 parts by weight of thermoplastic resin (parts by weight) | External appearance of the article | Dielectric constant | | | Dielectric loss tangent | | |
|---|---|---|---|---|---|---|---|---|---|---|
| | | | | | 1 GHz | 2 GHz | 3 GHz | 1 GHz | 2 GHz | 3 GHz |
| Example 1 | ZEONEX 280 | $BaTiO_3$ | 50 | good | 4.5 | 4.4 | 4.5 | 0.0006 | 0.0007 | 0.0006 |
| | | | 100 | good | 5.3 | 5.2 | 5.1 | 0.0008 | 0.0008 | 0.0009 |
| | | | 200 | good | 10.1 | 10.2 | 10.1 | 0.0010 | 0.0010 | 0.0010 |
| Example 2 | | $CaTiO_3$ | 50 | good | 3.2 | 3.3 | 3.2 | 0.0005 | 0.0006 | 0.0005 |
| | | | 100 | good | 4.5 | 4.5 | 4.5 | 0.0008 | 0.0008 | 0.0008 |
| | | | 200 | good | 7.3 | 7.2 | 7.3 | 0.0009 | 0.0009 | 0.0009 |
| Example 3 | | $SrTiO_3$ | 50 | good | 3.5 | 3.6 | 3.5 | 0.0005 | 0.0005 | 0.0005 |
| | | | 100 | good | 4.8 | 4.9 | 4.8 | 0.0008 | 0.0009 | 0.0008 |
| | | | 200 | good | 8.0 | 8.1 | 8.0 | 0.0010 | 0.0010 | 0.0010 |
| Comparative Example 1 | | | — | good | 2.3 | 2.3 | 2.3 | 0.0002 | 0.0002 | 0.0002 |
| Comparative Example 2 | | $Al_2O_3$ | 50 | good | 2.4 | 2.4 | 2.5 | 0.0005 | 0.0005 | 0.0005 |
| | | | 100 | good | 2.6 | 2.6 | 2.7 | 0.0008 | 0.0008 | 0.0008 |
| | | | 200 | good | 2.8 | 2.8 | 2.8 | 0.0009 | 0.0009 | 0.0009 |
| Example 4 | Resin obtained in Reference | $BaTiO_3$ | 50 | good | 4.3 | 4.2 | 4.3 | 0.0006 | 0.0006 | 0.0006 |
| | | | 100 | good | 7.2 | 7.1 | 7.1 | 0.0008 | 0.0008 | 0.0008 |
| | Example 1 | 200 | good | 15.1 | 15.2 | 15.2 | 0.0010 | 0.0010 | 0.0010 | |
| Comparative Example 3 | | | — | good | 2.3 | 2.3 | 2.4 | 0.0002 | 0.0002 | 0.0002 |

TABLE 1-continued

| Thermoplastic resin | | Ferroelectric | Amount of ferroelectric material per 100 parts by weight of thermoplastic resin (parts by weight) | External appearance of the article | Dielectric constant | | | Dielectric loss tangent | | |
|---|---|---|---|---|---|---|---|---|---|---|
| | | | | | 1 GHz | 2 GHz | 3 GHz | 1 GHz | 2 GHz | 3 GHz |
| Comparative Example 4 | | $Al_2O_3$ | 50 | good | 2.3 | 2.3 | 2.3 | 0.0006 | 0.0006 | 0.0006 |
| | | | 100 | good | 2.5 | 2.6 | 2.7 | 0.0008 | 0.0008 | 0.0008 |
| | | | 200 | good | 2.9 | 2.8 | 2.9 | 0.0011 | 0.0011 | 0.0011 |

* "good" means uniformity and no defect by observation with eyes.

TABLE 2

| | Thermoplastic resin | Ferroelectric | Amount of ferroelectric material per 100 parts by weight of thermoplastic resin (parts by weight) | External appearance of the article | Dielectric constant (1 GHz) | | | Dielectric loss tangent (1 GHz) | | |
|---|---|---|---|---|---|---|---|---|---|---|
| | | | | | 25° C. | 50° C. | 100° C. | 25° C. | 50° C. | 100° C. |
| Example 5 | ZEONEX 280 | $BaTiO_3$ | 50 | good | 4.5 | 4.5 | 4.5 | 0.0006 | 0.0007 | 0.0006 |
| Example 6 | | $CaTiO_3$ | 50 | good | 3.2 | 3.2 | 3.2 | 0.0005 | 0.0005 | 0.0005 |
| Example 7 | | $SrTiO_3$ | 50 | good | 3.5 | 3.5 | 3.5 | 0.0005 | 0.0005 | 0.0005 |
| Example 8 | poly-propylene | $BaTiO_3$ | 50 | good | 4.4 | 5.5 | 6.5 | 0.0009 | 0.01 | 0.04 |

* "good" means uniformity and no defect by observation with eyes.

We claim:

1. A resin composition comprising 100 parts by weight of thermoplastic norbornene resin and 50–900 parts by weight of ferroelectric material.

2. The resin composition according to claim 1 wherein the thermoplastic norbornene resin is selected from the group consisting of ring-opening polymers made from norbornene monomers, hydrogenated products of ring-opening polymers made from norbornene monomers, addition polymerization polymer made from norbornene monomers and addition polymerization copolymers of norbornene monomers and olefins.

3. The resin composition according to claim 2 wherein the thermoplastic norbornene resin has a number-average molecular weight of 10,000–200,000measured as polystyrene by gel permeation chromatography analysis.

4. The resin composition according to claim 2 wherein the thermoplastic norbornene resin is a hydrogenated product of a ring-opening polymer made from norbornene monomers and its hydrogenation ratio is 90–100% in the main chain structure.

5. The resin composition according to claim 2 wherein the thermoplastic norbornene resin was made of a monomer mixture in which the content of monomers having polar groups is 0–70 mol %.

6. The resin composition according to claim 1 wherein the thermoplastic norbornene resin has a metal content of 5 ppm or less.

7. The resin composition according to claim 1 wherein the ferroelectric material is selected from the group consisting of simple compounds having a simple cubic perovskite structure, complex compounds having a perovskite structure and materials having a perovskite-related octahedral structure.

8. The resin composition according to claim 1 wherein the ferroelectric material is selected from the group consisting of $BaTiO_3$, $PbTiO_3$, $PbZrO_3$, $NaNbO_3$, $KNbO_3$, $AgNbO_3$, $WO_3$, $(K_{1/2}Bi_{1/2})TiO_3$, $Pb(Fe_{1/2}Ta_{1/2})O_3$, $Pb(CO_{1/4}Mn_{1/4}W_{1/2})O_3$, $Pb(Zr_{1/3}Ti_{2/3})O_3$, $Pb(Mg_{1/3}Nb_{2/3})O_3$, $LiNbO_3$, $LiTaO_3$, $PbNb_2O_3$, $PbTa_2O_6$, $Ba_{1/2}Sr_{1/2}Nb_2O_6$, $Ba_2NaNb_5O_{15}$, $PbBi_2Nb_2O_9$, $Bi_2WO_6$, $Bi_4Ti_3O_{12}$, $Cd_2Nb_2O_7$, $Cd_2Ta_2O_7$, $Pb_2Ta_2O_7$ and $Pb_2Nb_2O_7$.

9. The resin composition according to claim 1 wherein the ferroelectric material has a dielectric constant larger than 120 at a frequency of 1 KHz.

10. The resin composition according to claim 9 wherein the ferroelectric material is selected from the group consisting of $BaTiO_3$, $CaTiO_3$ and $SrTiO_3$.

11. A formed article which is formed from the resin composition according to claim 1.

12. The formed article according to claim 11 wherein the formed article has a dielectric constant of 3.0–500 at a high frequency band of 1 GHz or higher and a dielectric loss tangent of 0–0.0100 at a high frequency band of 1 GHz or higher.

13. The formed article according to claim 11 wherein the formed article is a substrate for an antenna.

14. The formed article according to claim 11 wherein the formed article is a substrate for a circuit.

15. A formed article formed from a resin composition comprising 100 parts by weight of thermoplastic resin and 50–900 parts by weight of ferroelectric material, wherein the formed article has a dielectric loss tangent of 0–0.0100 at a high frequency band of 1 GHz or higher.

16. The formed article according to claim 15 wherein the formed article has a dielectric constant of 3.0–500 at a high frequency band of 1 GHz or higher.

17. The formed article according to claim 15 wherein the formed article is a substrate for an antenna.

18. The formed article according to claim 15 wherein the formed article is a substrate for a circuit.

* * * * *